3,241,977
EFFERVESCENT BEVERAGE POWDERS

William A. Mitchell, Lincoln Park, and Kenneth S. Ronai, Ridgewood, N.J., assignors to General Foods Corporation, White Plains, N.Y., a corporation of Delaware
No Drawing. Filed Jan. 2, 1962, Ser. No. 163,909
3 Claims. (Cl. 99—79)

This invention relates to the art of manufacturing an effervescent beverage powder that is reconstitutable to a beverage of the cola or fruit-flavored type which simulates the soda-like taste sensation or carbonation "bite" of bottled beverages.

Heretofore, the art has long sought the provision of a beverage powder such as would reconstitute into a saturated solution of carbon dioxide. In the main, prior art workers have concerned themselves with the creation of an effervescent couple through the reaction of a carbonate and an acid. Although this mechanism has been available for many years, no commercially sold beverage powder has been provided which on drinking approximates the carbonation sensation of beverages of the cola type vended in air-tight glass or metal containers produced by the creation of a saturated solution containing several volumes of carbon dioxide. At best, beverages formed from these dry powders are characterized as rapidly "fizzing" products which, upon addition to water undergo rapid reaction of the effervescent acid-carbonate couple with an almost immediate loss of any available carbon dioxide. In fact, upon the passage of as short a period of time as 2 to 3 minutes a substantially saline beverage is experienced with little or no discernible sustained carbonation.

It is an object of the present invention, therefore, to provide a beverage mix which substantially simulates the beverage character of a supersaturated solution of carbon dioxide which is commonly sold as a fruit flavored or cola beverage.

A more particular object of the present invention is to provide a beverage powder in a form such as can be readily reconstituted either with natural or artificial sweeteners and sustains the carbonation effect stemming from the reaction of acidic components and carbon dioxide-containing salts without encountering a rapid "fizzing" and degassing of the solution thus produced.

The present invention is founded upon the discovery that when a relatively instantly soluble bicarbonate salt and a relatively instantly soluble form of a food grade acid are put into solution rapidly (say in a period of less than 5 seconds) a solution of the reagents thus produced creates a metastable solution of carbon dioxide and simulates the beverage quality of a bottled or canned carbonated drink of the cola or fruit-flavored type. In accordance with the present invention a relatively soluble form of a bicarbonate salt is finely divided to a particle size which is capable of going rapidly into solution in a period of preferably less than 3 seconds; correspondingly, an acid powder such as citric, malic, fumaric, adipic and the like, is suitably sized through subdivision to a finely particulate state so that it too goes into solution rapidly and essentially in combination with the liquid bodies resulting from solution of the bicarbonate results in an immediate reaction betwen the solution products. While the present invention is not to be understood as restricted to any particular theory in discerning the scope thereof defined in the accompanying claims, it is believed the rapid and instantaneous reaction between the individual bodies of bicarbonate solution and acid solution resulting from distributing the powders thereof into water gives rise to a metastable state such as results from addition of liquid sodium bicarbonate solution and a liquid acid solution.

It is a particular feature of the present invention that both the acid component and the bicarbonate component in powder form should be at an optimum particle size such that substantially no trace quantities of over-sized food acid powders or bicarbonate powders are left suspended in the reconstituted beverage. In this way the fizzing phenomenon manifest in effervescent beverage powders of the prior art is reduced and solution efficiency is increased many-fold. Thus, in the case of sodium bicarbonate it will preferably be provided in a form that has a relatively narrow particle size distribution while at the same time being finely divided so as to be available for rapid and substantially instantaneous solution in the reconstituting liquid. Dissolution time should be under 5 seconds and preferably 2 to 3 seconds. Likewise the food acid such as citric acid and various of the other edible grade food acids will be finely divided and have a narrow particle size range such that they too will be substantially uniformly dispersed in the reconstituting aqueous medium and no over-sized acid bodies will be left available after 5 seconds in the aqueous medium. Essentially, the weight percent of bicarbonate to citric acid powder depends upon the intended degree of carbon dioxide saturation intended for the beverage solution. For fruit-flavored beverages a lower degree of saturation will be called for than in the case of a cola type which is more usually in the supersaturated or highly saturated category. Qualitatively, there should be an over-abundance of the uniformly sized acid powder. An over-abundance of fruit acid should be used so as to impart the required sourness to complement the fruit or other flavor desired for the beverage produced upon reconstitution of the powder. The amount of carbonation obtainable will depend upon the bicarbonate element of the reagents. Further, the level of bicarbonate component of the beverage mix should, in accordance with the present invention, be substantially below that point where solubility of the quantity of bicarbonate powder by weight of the reconstituted liquid will endanger the instantaneous creation of bicarbonate solution. In other words, an excess of bicarbonate powder should not be left suspended after the beverage mix has been reconstituted otherwise a nucleating and degassing effect will ensue as the effervescent couple continues to react. The level of acid required will be predicated upon the degree of sourness required for the intended flavor and, as indicated previously, in any event will be in excess of that amount required to provide a complete and sufficient reaction in furnishing the carbon dioxide solution; thus, the acid should not and will not be completely neutralized in the course of creating the carbon dioxide solution.

The invention in its various embodiments will now be more fully described. One preferred embodiment of the invention involves grinding and sifting sodium, potassium or other water-soluble form of bicarbonate to a finely divided uniform state having an average particle size of about 400 mesh. The particle size must be small but at the same time be above that particle size where the particles themselves will clump or float upon attempted reconstitution in water. In general, the average particle size of these finely divided and sifted sodium bicarbonate powders will range from about 35 to 55 microns.

Similarly, the acid component of the effervescent couple will be finely divided to a narrow particle size distribution range and have a particle size substantially below that level whereat any insoluble bodies of acid powders will exist and at the same time be above that level whereat "floaters" or finely suspended food powders will be manifest such as will be available for reaction with any over-sized particles of bicarbonate. For most edible food grade acids such as citric, adipic, tartaric and the like, the particle size range will be such that 95% of the acid powder passes a number 50 mesh screen and will not be small enough to result in clumping. The particles should have an average mean diameter not greater than about 300 microns. In the case of the acid powders, they are less likely to float and clump and, hence, the smaller mesh of particle size is not as crtical as with the bicarbonate powder. In any event, the acid powder should be subdivided to a particulate state whereat substantially all of the free bodies thereof will enter into solution for reaction in a period of less than 5 seconds and preferably in 1 to 3 seconds.

As an alternative form of the invention, the sodium bicarbonate may be dissolved in water and the solution subdivided to a finely particulate state and dried at below 100° F. This will result in a free-flowing powderous uniform finely divided form of bicarbonate powder. Thus, a water solution of sodium or potassium bicarbonate solution may be spray dried under conditions which yield a particle size distribution within the aforestated particle size range. In still another embodiment of the invention, the finely divided bicarbonate can be co-dried with a bulking agent of the water-soluble type such as any one of the variety of mono-, di-, and polysaccharides typified by sucrose and dextrose. In this embodiment of the invention the bulking agent will be placed in solution (e.g., sucrose), the sodium bicarbonate powder will be dispersed therein and the solution will then be spray dried. Alternatively, a solution of sodium bicarbonate may be co-dried with a sugar solution (such as sucrose) to the aforestated particle size wherein the sodium bicarbonate powder will be rendered available for substantially rapid and instantaneous solution upon reconstitution with the acid component of the beverage mix.

The two dry mix components can be intermixed with sucrose or any other flavoring agent such as dextrose, lactose, corn syrup solids and the like or, alternatively, can be combined with an artificial sweetener such as saccharin, sodium cyclamates and saccaharin in combination with sodium cyclamates.

The powder should be packaged in a substantially fluffy condition such that the components are maintained as substantially discrete one from the other as possible, while avoiding any interaction such as may result through the presence of moisture during and after packaging. Accordingly, it is important that the dry mixes be packaged in a hermetic container such as substantially maintains whatever moisture equilibrium exists during initial packaging of the powderous material. In packaging the components of the present invention, care should be taken to assure that the discrete and finely divided state of the acid and bicarbonate components is maintained with a minimum of clumping or compaction so that upon opening the envelope or other container therefor they will be rapidly and instantly soluble with a minimum of nucleation and the concomitant fizzing and degassing effects which could ensue.

In accordance with the present invention, it is possible to obtain carbon dioxide efficiencies of about 85% of theoretical through reaction of the bicarbonate with the acid. This represents a markedly improved reaction efficiency in comparison to the beverage powders and pills now marketed for beverage carbonation purposes. Upon reconstitution the mix rapidly goes into solution upon simple spoon stirring with one stir. The mix itself may be added to warm or cold water (preferably cold) to maintain maximum carbon dioxide retention. The water may have a sweetening agent such as sucrose separately added to it by the consumer or sucrose may be present in the mix and added with the acid and bicarbonate component thereof. Accordingly, it is preferred in accordance with the present invention, that the sugar be sold as a component of the mix to assure the desired carbonation result is achieved. On the other hand, the housewife or other consumer can be instructed to place the sugar, sucrose or other sweetening agent into solution prior to addition of the mix thereto. Where the sweetening agent (e.g., sucrose) is placed in intimate admixture with the bicarbonate and acid components, the sugar, sucrose or other sweetening agent should be finely divided to a particulate state approximating that of the bicarbonate powder itself so as to assure that there is virtually no nucleating agent present when the mix is reconstituted.

Upon reconstitution the beverage will effervesce for just an instant (say in the neighborhood of 1 to 2 seconds) during which time bubbles will ascend to give somewhat of a sparkling and visible effect of carbonation like that of a bottled carbonated beverage. However, unlike the fizz pills and powders of the prior art, this ebullition will only last for an instant and only very few bubbles will be apparent. Thereafter visible carbonation will cease completely and only several small bubble clusters will remain on the sides of the containing vessel. The beverage solution can then stand for a long period of time (10 to 30 minutes) without any ebullition of $CO_2$. Upon consumption of the beverage the consumer will experience a carbonation "bite" like that of bottled carbonated beverages due to release of gaseous $CO_2$ in the mouth. Indeed, it is at this point that the effervescent effect will be experienced and this will occur rapidly to furnish the required refreshment and novel sensation to complement the flavoring or other constituents of the beverage. As contrasted from the beverage or fizz pills employing an effervescent couple, the reconstituted mix will stand for extended periods of time without losing its inherent carbonation effect. The reconstituted beverage can stand for over an hour at room temperature without losing its carbonation properties, the carbon dioxide thereof being lost very slowly.

The invention will now be more fully described by reference to the accompanying detailed operative example.

EXAMPLE 1

*A one volume beverage concentrate*

| Constituents: | Grams |
|---|---|
| Precipitated sodium bicarbonate (45 micron average mean diameter) | 900 |
| Anhydrous powdered citric acid (297 micron average mean diameter) | 1390 |
| Sodium cyclamate-saccharin (3:1 ratio) | 150 |
| Flavor | 9 |
| Color | 1 |

The citric acid and sodium bicarbonate are mixed and then tumbled within a smooth drum 10 inches in diameter and 15 inches long, turning about a horizontal axis parallel to the longitudinal axis of the drum. The speed of rotation is 100 r.p.m. The tumbling is carried out for about 5 minutes. Next the cyclamate-saccharin (3 parts cyclamate to 1 part saccharin), flavor, and color ingredients are added to the drum and tumbling continued for 1 to 2 hours at a humidity of 20 to 40% and a temperature of about 75° F.

In this manner a thoroughly blended and homogenous mixture of the finely powdered ingredients is obtained which can be packaged in small aluminum foil envelopes suitable for containing enough dry mix to form a 7 ounce beverage drink. Each envelope should contain about 2.7 grams of the dry beverage concentrate in order to form a 7 ounce (200 cc. of water) carbonated beverage containing about one volume $CO_2$. One swish of the stirring spoon is enough to dissolve the beverage in 1 to 3 seconds to give a metastable one volume water solution of $CO_2$. The carbonated drink exhibits no visible effervescence or carbonation after a slight gaseous release of $CO_2$ which bubbles off on initial contact of the dry powder and water. The beverage solution is stable on standing for 10 to 30 minutes and only gradually loses soluble $CO_2$ to the atmosphere. The beverage has a distinct carbonation "bite" when placed in the mouth after 15 to 30 minutes.

While this invention has been described with particular reference to the preferred alkali metal bicarbonates such as sodium and potassium bicarbonate as the carbonating agents to be used in practicing the invention it is understood that other forms of carbonating agents may be used such as sodium or potassium carbonate.

It will also be apparent to those skilled-in-the-art that although this invention has been described in terms of a specific example, that various modifications may be made thereto which will fall within the scope of the appended claims.

What is claimed is:

1. A rapidly dissolving, dry effervescent concentrate adapted to form a carbonated beverage with water, comprising a plurality of ingredients including an acid component and a carbonating component, said acid component including particles of an edible food acid having an average mean diameter not greater than about 300 microns, and said carbonating component consisting essentially of particles of an alkali metal bicarbonate having an average mean diameter not greater than about 55 microns, all of said ingredients being soluble in water with agitation in less than 5 seconds.

2. A concentrate as claimed in claim 1, in which said food acid is selected from the group consisting of citric acid, adipic acid and tartaric acid.

3. A rapidly dissolving, dry effervescent concentrate adapted to form a carbonated beverage with water, comprising a plurality of ingredients including an acid component and a carbonating component, said acid component including particles of an edible food acid having an average mean diameter not greater than about 300 microns, and said carbonating component consisting essentially of particles of an alkali metal bicarbonate having an average mean diameter of about 35 to 55 microns, said acid component being present in an amount in excess of that required to completely react with said carbonating component, all of said ingredients being soluble in water with agitation in about 1 to 3 seconds.

References Cited by the Examiner

UNITED STATES PATENTS

| 2,463,962 | 3/1949 | Gorsica | 99—79 |
| 2,603,569 | 7/1952 | Alther et al. | 99—79 X |
| 2,742,363 | 4/1956 | Hughes | 99—79 X |
| 2,851,361 | 9/1958 | Diller | 99—95 X |
| 2,868,646 | 1/1959 | Schapiro | 99—78 |
| 2,984,543 | 5/1961 | Smith | 99—78 X |
| 3,108,002 | 10/1963 | Raffensberger | 99—78 |

OTHER REFERENCES

Mellor: Comprehensive Treatise on Inorganic and Theoretical Chemistry, vol. 6, 1925, pub. by Longmans, Green and Co., N.Y., page 50, QD 31 M4.

A. LOUIS MONACELL, *Primary Examiner.*